United States Patent
Drack et al.

(10) Patent No.: US 10,240,576 B2
(45) Date of Patent: Mar. 26, 2019

(54) WIND TURBINE NOISE REDUCTION WITH ACOUSTICALLY ABSORBENT SERRATIONS

(71) Applicant: General Electric Company, Schenectady, NY (US)

(72) Inventors: Lorenz Edwin Drack, Bavaria (DE); Thierry Pascal Maeder, Bavaria (DE); Roger Drobietz, North Rhine-Westphalia (DE)

(73) Assignee: General Electric Company, Schenectady, NY (US)

( * ) Notice: Subject to any disclaimer, the term of this patent is extended or adjusted under 35 U.S.C. 154(b) by 346 days.

(21) Appl. No.: 14/952,041

(22) Filed: Nov. 25, 2015

(65) Prior Publication Data
US 2017/0145990 A1    May 25, 2017

(51) Int. Cl.
*F03D 1/06* (2006.01)

(52) U.S. Cl.
CPC ...... *F03D 1/0641* (2013.01); *F05B 2260/964* (2013.01); *Y02E 10/721* (2013.01)

(58) Field of Classification Search
None
See application file for complete search history.

(56) References Cited

U.S. PATENT DOCUMENTS

| | | | |
|---|---|---|---|
| 5,088,665 A * | 2/1992 | Vijgen | B64C 23/06 244/198 |
| 7,901,189 B2 | 3/2011 | Gupta et al. | |
| 7,959,412 B2 | 6/2011 | Bonnet | |
| 8,267,657 B2 | 9/2012 | Huck et al. | |
| 8,414,261 B2 | 4/2013 | Bonnet | |
| 9,719,490 B2 * | 8/2017 | Caruso | F03D 1/0675 |
| 9,841,002 B2 * | 12/2017 | Oerlemans | F03D 1/0608 |
| 2003/0175121 A1 * | 9/2003 | Shibata | F03D 1/0641 416/131 |
| 2008/0107540 A1 * | 5/2008 | Bonnet | F03D 1/0675 416/229 R |
| 2009/0290982 A1 * | 11/2009 | Madsen | F03D 1/0633 416/61 |

(Continued)

FOREIGN PATENT DOCUMENTS

| DE | 102005019905 B4 | 12/2012 |
|---|---|---|
| EP | 1607624 A2 | 12/2005 |

(Continued)

OTHER PUBLICATIONS

Oerlemans et al., "Reduction of wind turbine noise using optimized airfoils and trailing-edge serrations", National Aerospace Laboratory NLR, vol. 47, Issue 6, p. 5 of 16 Pages, Jun. 2009.

(Continued)

*Primary Examiner* — Jason D Shanske
*Assistant Examiner* — Theodore C Ribadeneyra
(74) *Attorney, Agent, or Firm* — Mary Louise Stanford

(57) ABSTRACT

A wind turbine blade includes a trailing edge including a radially inboard portion and a radially outboard portion opposite the radially inboard portion. The trailing edge further includes at least one serrated portion extending at least partially between the radially inboard portion and the radially outboard portion. The serrated portion includes at least one substantially acoustically absorbent material.

18 Claims, 8 Drawing Sheets

(56) References Cited

U.S. PATENT DOCUMENTS

| | | |
|---|---|---|
| 2010/0143151 A1 | 6/2010 | Kinzie et al. |
| 2011/0142635 A1* | 6/2011 | Fritz .................... F03D 1/0675 |
| | | 416/62 |
| 2011/0142665 A1* | 6/2011 | Huck .................... F03D 1/0633 |
| | | 416/228 |
| 2011/0142668 A1* | 6/2011 | Rao ...................... F03D 1/0675 |
| | | 416/229 R |
| 2011/0223030 A1* | 9/2011 | Huck .................... F03D 1/0675 |
| | | 416/228 |
| 2012/0027590 A1 | 2/2012 | Bonnet |
| 2013/0323070 A1* | 12/2013 | Grabau ................ F03D 1/0675 |
| | | 416/229 R |
| 2014/0072440 A1* | 3/2014 | Jacobsen ................. F03D 1/06 |
| | | 416/241 R |
| 2014/0227101 A1* | 8/2014 | Yao ...................... F03D 1/0608 |
| | | 416/236 R |
| 2014/0294592 A1 | 10/2014 | Drack et al. |
| 2014/0301864 A1* | 10/2014 | Singh ................... F03D 1/0608 |
| | | 416/90 R |
| 2015/0050154 A1* | 2/2015 | Dixon .................. F03D 1/0633 |
| | | 416/223 A |
| 2015/0078896 A1 | 3/2015 | Oerlemans |
| 2015/0078913 A1 | 3/2015 | Enevoldsen et al. |

FOREIGN PATENT DOCUMENTS

| | | |
|---|---|---|
| EP | 2806156 A1 | 11/2014 |
| WO | 2015074661 A1 | 5/2015 |

OTHER PUBLICATIONS

Barone, "Survey of Techniques for Reduction of Wind Turbine Blade Trailing Edge Noise", Sandia National Laboratories Albuquerque, New Mexico 87185 and Livermore, California 94550, p. 3 of 30 Pages.

Yang, "Research status on aero-acoustic noise from wind turbine blades", 6th International Conference on Pumps and Fans with Compressors and Wind Turbines, vol. 52, Issue 1, p. 7 of 10 Pages, 2013.

* cited by examiner

WIND TURBINE NOISE REDUCTION WITH ACOUSTICALLY ABSORBENT SERRATIONS

BACKGROUND

The field of the invention relates generally to wind turbine generators and, more particularly, to systems and methods for reducing noise generated by wind turbine blades.

Most known wind turbine generators include a rotor having multiple blades. The rotor is sometimes coupled to a housing, or nacelle, that is positioned on top of a base, for example, a tubular tower. At least some known utility grade wind turbines, i.e., wind turbines designed to provide electrical power to a utility grid, include rotor blades having predetermined shapes and dimensions. The rotor blades transform mechanical wind energy into induced blade lift forces that further induce a mechanical rotational torque that drives one or more generators, subsequently generating electric power. A plurality of wind turbine generators in a localized geographic array is typically referred to as a wind farm or a wind park.

During operation of such known wind parks or an individual wind turbine, rotational transiting of the rotor blades through air generates aerodynamic acoustic emissions, or noise. As a consequence, at least some of these known wind parks, or an individual wind turbine, will receive noise receptor devices in their vicinity to measure the noise level. At least some of such measured acoustic noises have a decibel (dB) level that may approach local regulatory levels. To comply with the limits, at least some of the wind turbines of the park, or the individual wind turbine, may need to be put into a noise reduced operation (NRO) mode for a period of time. A wind turbine is less efficient at generating electrical energy when in a NRO mode, but produces less noise. The reduction of noise comes at the cost of annual energy production (AEP). Therefore, it is necessary to avoid the application of NROs to increase AEP.

BRIEF DESCRIPTION

In one aspect, a wind turbine blade including a trailing edge is provided. The trailing edge includes a radially inboard portion and a radially outboard portion opposite the radially inboard portion. The trailing edge further includes at least one serrated portion extending at least partially between the radially inboard portion and the radially outboard portion. The serrated portion includes at least one substantially acoustically absorbent material.

In a further aspect, a retrofit system for a wind turbine blade is provided. The wind turbine blade includes a trailing edge. The retrofit system includes a mounting structure for coupling the system to the trailing edge. The retrofit system further includes at least one serrated portion extending at least partially along the mounting structure. The serrated portion includes at least one substantially acoustically absorbent material.

In another aspect, a method for reducing noise emission from a wind turbine blade is provided. The wind turbine blade includes a trailing edge. The method includes providing a wind turbine noise abatement device including a mounting structure having at least one serrated portion. The at least one serrated portion includes at least one substantially acoustically absorbent material. The method further includes preparing the trailing edge to receive the mounting structure and coupling the mounting structure to the trailing edge.

DRAWINGS

These and other features, aspects, and advantages of the present disclosure will become better understood when the following detailed description is read with reference to the accompanying drawings in which like characters represent like parts throughout the drawings, wherein.

Figure 3:
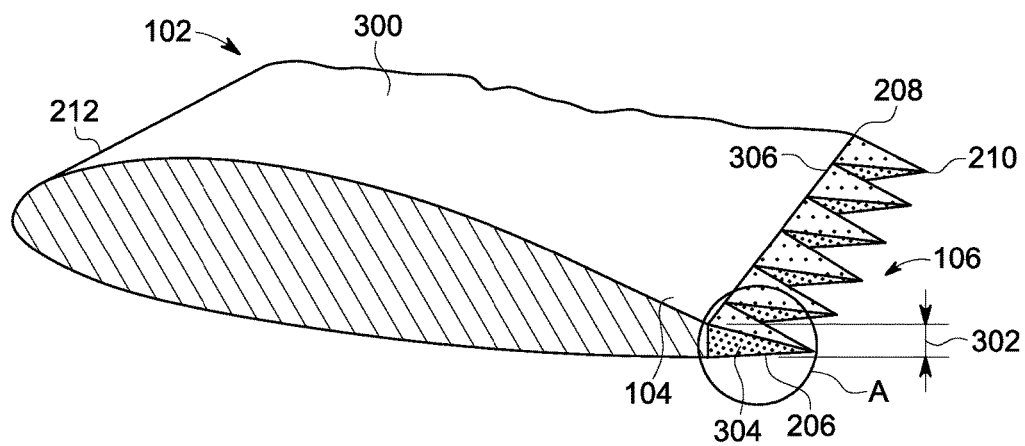
FIG. 3 is schematic perspective cutaway view of the wind turbine blade shown in FIG. 2, the wind turbine blade having serrations at the trailing edge.
Figure 13:
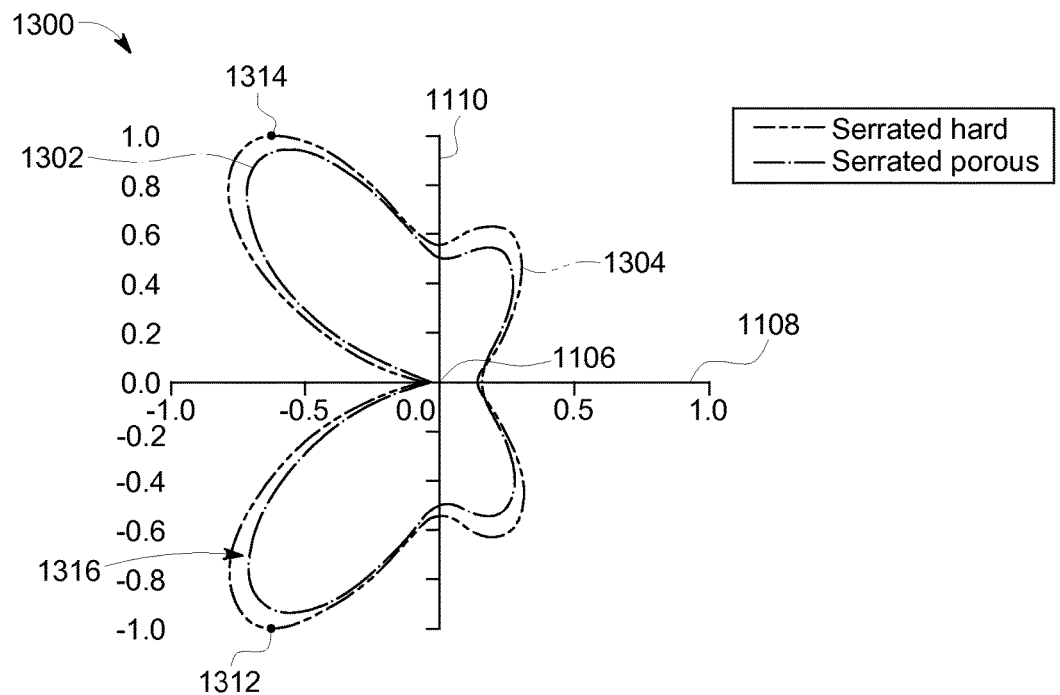
Figure 14:
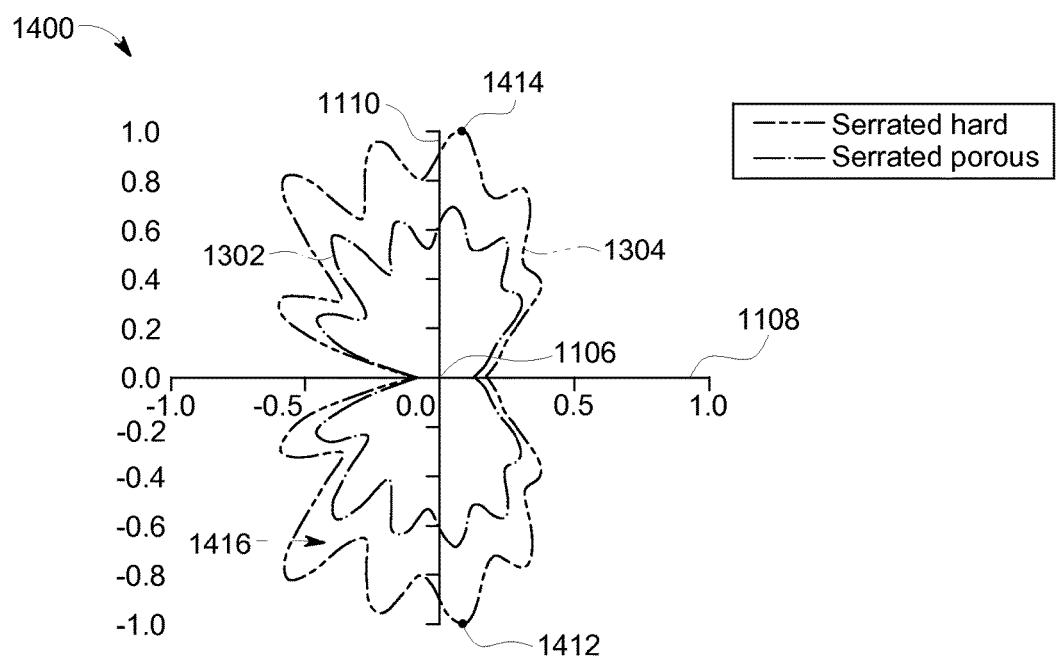

FIG. 13 is an exemplary graphical view of a comparison between the noise generated by a wind turbine blade having a hard, serrated trailing edge and the wind turbine blade shown in FIG. 3 having an acoustically absorbent, serrated trailing edge at a first frequency; and FIG. 14 is an exemplary graphical view of a comparison between the noise generated by a wind turbine blade having a hard, serrated trailing edge and the wind turbine blade shown in FIG. 3 having an acoustically absorbent, serrated trailing edge at a second, higher frequency.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The wind turbine blades and modifications to wind turbine blades through retrofitting described herein provide systems and methods for reducing noise emanating from wind turbine blades. Specifically, the systems and methods described herein use wind turbine blades including serrated trailing edges fabricated from at least one substantially acoustically absorbent material to mitigate noise produced by operation of a wind turbine. Boundary-layer turbulence interaction with the trailing edge of the wind turbine blade, while in motion, is a primary source of aerodynamic noise emanating from wind turbine blades in operation. This noise is approximated by quadrupole sources which interact in the turbulent boundary-layer to produce dipole-like noise radiation patterns. In comparison to trailing edges with straight edges, serrated portions included in a trailing edge portion of the wind turbine blade reduce coherent scattering of the noise emanating from the wind turbine blade, approximated as the quadrupole sources. Reducing coherent scattering of the quadrupole sources mitigates the noise emanating from the wind turbine blade while in operation. The reduction in noise emanating from the wind turbine blades reduces the need for the wind turbine to be put into a noise reduced operation (NRO) mode to comply with a decibel (dB) level that may approach local regulatory levels. The reduction in NRO increases the annual energy production (AEP) of the wind turbine.

The serrated portion of the trailing edge includes at least one substantially acoustically absorbent material. The substantially acoustically absorbent materials function as sound absorbers and/or turbulence dampers. In at least some of the embodiments disclosed herein, the substantially acoustically absorbent materials are substantially porous. The acoustically absorbent materials reduce a magnitude of the sound reflected from the wind turbine blade in comparison to wind turbine blades having hard surfaces and/or materials. The acoustically absorbent materials thus mitigate noise emanating from the wind turbine blade while in operation. The reduction in noise emanating from the wind turbine blades reduces the need for NRO and increases AEP.

The combination of serrated portions of the trailing edge and at least one substantially acoustically absorbent material included in the serrated portions reduces the coherent scattering strength of noise emanating from the wind turbine blade through the combination of the geometry of the serrations and the effect of the acoustically absorbent material on the reflected sound. The combination of serrated portions of the trailing edge and at least one substantially acoustically absorbent material included in the serrated portions results in greater noise mitigation than the sum of the noise mitigated by serrated portions alone and substantially acoustically absorbent materials alone.

Figure 1:
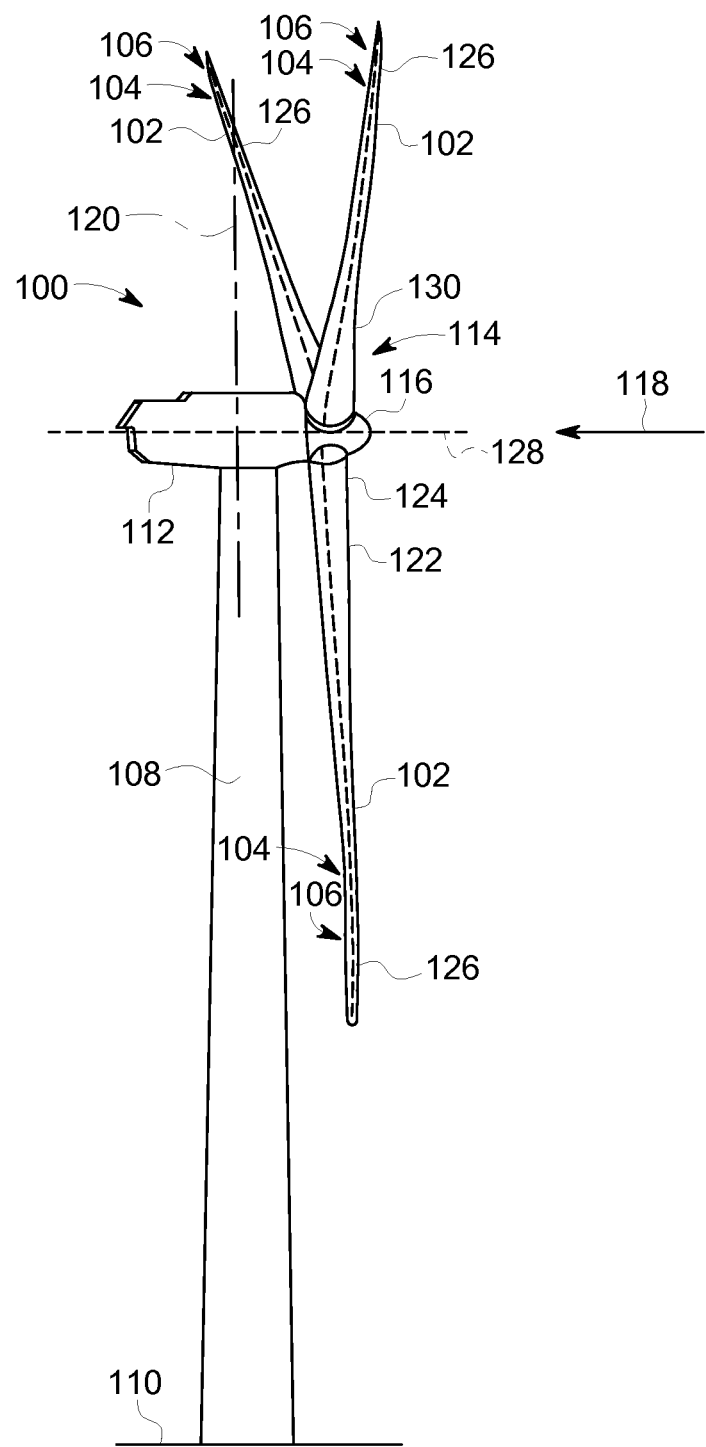
FIG. 1 is a schematic view of an exemplary wind turbine generator that includes a plurality of wind turbine blades configured to reduce an amount of noise generated by the wind turbine generator.

FIG. 1 is a schematic view of an exemplary wind turbine generator 100 having rotor blades 102 having trailing edge portions 104 which include a serrated portion 106 that, in turn, includes at least one substantially acoustically absorbent material (not shown in FIG. 1). In the exemplary embodiment, wind turbine generator 100 is a horizontal axis wind turbine. Alternatively, wind turbine generator 100 may be a vertical axis wind turbine. Wind turbine generator 100 includes a tower 108 extending from a supporting surface 110, a nacelle 112 coupled to tower 108, and a rotor 114 coupled to nacelle 112. Rotor blades 102 are coupled to nacelle 112. Rotor 114 has a rotatable hub 116 to which a plurality of rotor blades 102 are coupled. In the exemplary embodiments, rotor 114 has three rotor blades 102. Alternatively, rotor 114 has any number of rotor blades 102 that enables wind turbine generator 100 to function as described herein. In the exemplary embodiment, tower 108 is fabricated from tubular steel and has a cavity (not shown in FIG. 1) extending between supporting surface 110 and nacelle 112. Alternatively, tower 108 is any tower that enables wind turbine generator 100 to function as described herein including, but not limited to, a lattice tower. The height of tower 108 is any value that enables wind turbine generator 100 to function as described herein.

Blades 102 are positioned about rotor hub 116 to facilitate rotating rotor 114, thereby transferring kinetic energy from wind 118 into usable mechanical energy, and subsequently, electrical energy. Rotor 114 and nacelle 112 are rotated about tower 108 on a yaw axis 120 to control the perspective of blades 102 with respect to the direction of wind 118. Blades 102 are mated to hub 116 by coupling a blade root portion 122 to hub 116 at a plurality of load transfer regions 124. Load transfer regions 124 have a hub load transfer region and a blade load transfer region (both not shown in FIG. 1). Loads induced in blades 102 are transferred to hub 116 via load transfer regions 124. Each of blades 102 also includes a blade tip portion 126.

In the exemplary embodiment, blades 102 have a length between 50 meters (m) (164 feet (ft)) and 100 m (328 ft), however these parameters form no limitations to the instant disclosure. Alternatively, blades 102 may have any length that enables wind turbine generator 100 to function as described herein. As wind 118 strikes each of blades 102, blade lift forces (not shown) are induced on each of blades 102 and rotation of rotor 114 about rotation axis 128 is induced as blade tip portions 126 are accelerated. A pitch angle (not shown) of blades 102, i.e., an angle that determines each of blades' 102 perspective with respect to the direction of wind 118, may be changed by a pitch adjustment mechanism (not shown in FIG. 1). Specifically, increasing a pitch angle of blade 102 decreases a percentage of area 130 exposed to wind 118 and, conversely, decreasing a pitch angle of blade 102 increases a percentage of area 130 exposed to wind 118. Blade lift forces are directly proportional to blade surface area 130 exposed to wind 118. Rotor 114, driven by blade lift forces, rotates a generator (not shown) coupled to rotor 114 and positioned within nacelle 112. The generator converts mechanical motion of rotor 114 into electrical energy.

As speed of blade tip portion 126 increases, an amplitude (not shown) of acoustic emissions (not shown in FIG. 1) from blade 102 increases. Conversely, as the speed of blade tip portion 126 decreases, an amplitude of acoustic emissions from blades 102 decreases. Therefore, the amplitude of acoustic emissions from blades 102 has a known relationship to a rotational speed of blade tip portions 126, typically increasing with a power of around 5/2 of the inflow velocity of wind 118, and the amplitude of acoustic emissions from blades 102 has a known relationship to blade pitch angle. Blade pitch angle for blades 102 may be adjusted to reduce noise by reducing the speed of blade tip portion 126 and putting wind turbine generator 100 into an NRO mode. The acoustic emissions from blades 102 are mitigated by serrated portions 106 of trailing edge portion 104 and the at least one substantially acoustically absorbent material included in serrated portions 106. This reduces the need for wind turbine generator 100 to be put into an NRO mode in order to comply with noise regulations.

Figure 2:
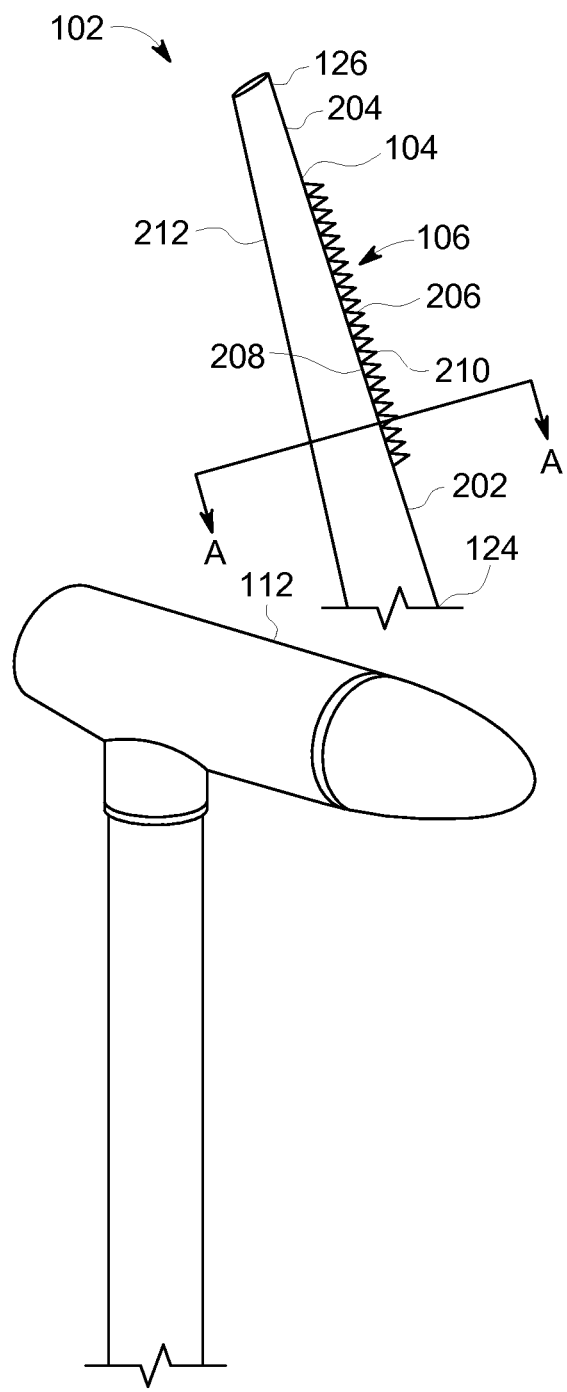
FIG. 2 is a schematic view of a portion of an exemplary wind turbine blade that may be used with the wind turbine generator shown in FIG. 1.

FIG. 2 is a schematic view of a portion of a wind turbine blade 102 that may be used with wind turbine generator 100. Serrated portions 106 extend at least partially between a radially inboard portion 202 of blade 102 and a radially outboard portion 204 of blade 102. Radially inboard portion 202 is located closer to nacelle 112 than radially outboard portion 204. Radially outboard portion 204 includes tip portion 126 of blade 102 and radially inboard portion 204 includes root portion 122 of blade 102.

In the exemplary embodiment, at least one serrated portion 106 terminates prior to tip portion 126 and prior to root portion 122. In alternative embodiments, at least one serrated portion 106 extends from root portion 122 to tip portion 126 for substantially the length of blade 102.

In some embodiments, at least one serrated portion 106 is entirely located within a distance of approximately thirty percent of the length of blade 102 from tip portion 126 toward load transfer region 124, i.e., at least one serrated portion 106 extends within the radially outboard thirty percent of blade 102. The remaining approximately seventy percent of blade 102 does not include any serrated portions 106.

In alternative embodiments, at least one serrated portion 106 extends for a length less than the approximately radially outboard thirty percent of blade 102 and is located anywhere within the approximately radially outboard thirty percent of blade 102. The remaining approximately seventy percent of blade 102 does not include any serrated portions 106. In additional alternative embodiments, at least one serrated portion 106 is located within the approximately radially outboard forty percent of blade 102 as measured from the radially outboard termination of tip portion 126. In still further alternative embodiments, at least one serrated portion 106 is located within the approximately radially outboard fifty percent of blade 102 as measured from the radially outboard termination of tip portion 126. Similarly, in some alternative embodiments, rather than a precise approximately thirty, forty, and fifty percent of the length of blade 102, at least one serrated portion 106 is located within the radially outboard portion of blade 102 in a range from approximately twenty percent to approximately forty percent of the length of blade 102 as measured from the radially outboard termination of tip portion 126.

Also, similarly, in other alternative embodiments, at least one serrated portion 106 is located within the radially outboard portion of blade 102 in a range from approximately ten percent to approximately twenty percent of the length of blade 102 as measured from the radially outboard termination of tip portion 126. In yet other alternative embodiments, serrated portions 106 are located elsewhere along blade 102, e.g., and without limitation, serrated portions 106 extend substantially to load transfer region 124 of blade 102.

In some embodiments, serrated portion 106 is continuous. In alternative embodiments serrated portion 106 is discontinuous and includes at least two discrete serrated portions 106. Blade 102 is not serrated between discrete serrated portions 106. For example, blade 102 includes a plurality of serrated portions 106. Each serrated portion is located within a distance of thirty percent of the length of blade 102 from tip portion 126. Alternatively, the plurality of serrated portions 106 are located at any position on blade 102.

Serrated portion 106 includes a plurality of structures 206 extending from a base portion 208 to a tip portion 210 in a direction away from a leading edge portion 212 of blade 102. In some embodiments, structures 206 have a substantially triangular shape. In alternative embodiments, structures 206 have other shapes that enable serrated portion 106 to function as described herein including, but not limited to, a triangle with a rounded or tip portion 210, a trapezoid, a semicircle, a rectangle, and/or other shapes. In some embodiments, serrated portion 106 includes only a single repeating structure 206. For example, serrated portion 106 includes only repeating triangular structures 206. In alternative embodiments, serrated portion 106 includes a plurality of structures 206 having different shapes.

FIG. 3 is a schematic perspective cutaway view, along section A-A (shown in FIG. 2) of wind turbine blade 102. Blade 102 includes, e.g., is shaped to include, an airfoil 300. Airfoil 300 has any shape that enables blade 102 to function as described herein. Trailing edge portion 104 includes serrated portion 106 and structures 206 thereof. Each structure 206 extends from base portion 208 to tip portion 210 in a direction away from leading edge portion 212. In some embodiments, structures 206 are substantially three dimensional and include a non-nominal thickness 302. In some embodiments, thickness 302 of structures 206 decreases between base portion 208 and tip portion 210 of structures 206. For example, thickness 302 of structures 206 at base portion 208 is within the range of two millimeters (mm) to four mm. In some embodiments, structures 206 are shaped with thickness 302 such that structures 206 continue the shape of airfoil 300. Structures 206 may function with the shape of airfoil 300 to provide some aerodynamic lift. In some embodiments, structures 206 do not contribute to the aerodynamic lift generated by airfoil 300, but include a variable thickness 302. Structures 206 may taper from thickness 302 at base portion 208 to tip portion 210. In alternative embodiments, structures 206 may have a substantially unchanging thickness 302. In some embodiments, structures 206 may have a substantially nominal thickness 302.

The geometry of structures 206 and serrated portion 106 facilitates decreasing the acoustic emissions emanating from blade 102 by reducing coherent scattering of noise from trailing edge portion 104. Compared to a straight-edged trailing edge portion (not shown in FIG. 3), blade 102 including serrated portion 106 reduces coherent scattering of acoustic emissions caused by boundary-layer turbulence interacting with trailing edge portion 104. Serrated portion 106 reflects acoustic emissions such that the emissions are less coherent in comparison to a straight-edged trailing edge portion. This effect is caused by the geometry of serrated portion 106 including the geometry of structures 206.

Serrated portion 106 includes at least one substantially acoustically absorbent material 304. In some embodiments, serrated portion 106 includes only a single substantially acoustically absorbent material 304. In alternative embodiments, serrated portion 106 includes a plurality of substantially acoustically absorbent materials 304. Substantially acoustically absorbent material 304 facilitates increasing an acoustic absorption coefficient of blade 102 in comparison to a blade (not shown in FIG. 3) which does not include serrated portion 106 including at least one substantially acoustically absorbent material 304. In some embodiments, substantially acoustically absorbent material 304 is a substantially porous material. In these embodiments, the pores of substantially acoustically absorbent material 304 function as sound absorbers which absorb at least a portion of the acoustic emissions caused by the boundary-layer turbulence interacting with trailing edge portion 104. The substantially acoustically absorbent material 304 and the pores therein may also function as a turbulence damper which reduces turbulence in the boundary layer and reduces acoustic emissions caused by the boundary-layer turbulence interacting with trailing edge portion 104 in comparison to hard or non-acoustically absorbent materials. Serrated portion 106 reduces the coherent scattering strength of acoustic emissions from blade 102 through the geometry of serrated portion 106 and structures 206 and through the effect of substantially acoustically absorbent martial 304, e.g., an acoustically absorbent material, on the reflected sound and on the turbulence activity in the boundary-layer.

Substantially acoustically absorbent material 304 is, or includes, any material that enables substantially acoustically absorbent material 304 to function as described herein. As described above, in at least some embodiments, for example, and without limitation, substantially acoustically absorbent material 304 may be, or include, a structural foam, a series of three dimensional structures including a plurality of pores defined therein formed by additive manufacturing, a self-supporting shell with an epoxy matrix, a micro-perforated metal, or other substantially acoustically absorbent material. In alternative embodiments, substantially acoustically absorbent material 304 is a fibrous material.

In some embodiments, blade 102 is fabricated with serrated portion 106 and/or structures 206 made of a single substantially acoustically absorbent material 304. In such a case, substantially acoustically absorbent material 304 is self-supporting. No casing or supportive material is used. For example, substantially acoustically absorbent material 304 may be added to trailing edge portion 104 using adhesive, fasteners, or additive manufacturing. In some embodiments, blade 102 is manufactured with trailing edge portion 104 initially terminating at edge 306. Serrated portion 106 including self-supporting substantially acoustically absorbent material 304 is coupled to blade 102 at edge 306 and forms part of trailing edge portion 104. In alternative embodiments, any other suitable manufacturing techniques for producing blade 102 having trailing edge portion 104 including self-supporting substantially acoustically absorbent material 304 are used.

Figure 4:
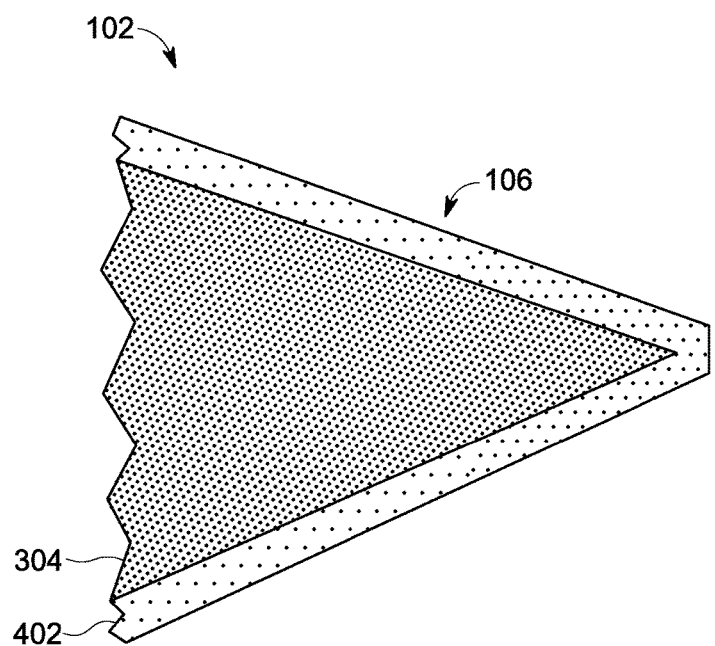
FIG. 4 is a schematic cross-sectional view of an exemplary serration of the wind turbine blade shown in FIG. 3.

FIG. 4 is a schematic cross-sectional view, detail view A, of an exemplary alternative embodiment of serrated portion 106 shown in FIG. 3. In some alternative embodiments, serrated portion 106 includes a single substantially acoustically absorbent material 304 encased with a casing material 402. Casing material 402 is configured to substantially allow acoustic emissions from blade 102 to pass through casing material 402. Casing material 402 is made of a material which has a substantially high acoustic transmission coefficient. For example and without limitation, casing material 402 is or includes poly-paraphenylene terephthalamide or other suitable materials with a substantially high acoustic transmission coefficient. Additionally or alternatively, casing material 402 has a geometry or other characteristics which allow for the transmission of acoustic emissions through casing material 402. For example and without limitation, casing material 402 is perforated plate made of metal, plastic, or other suitable materials.

Casing material 402 supports and/or protect substantially acoustically absorbent material 304 encased within casing material 402. In some embodiments, substantially acoustically absorbent material 304 is not self-supporting. In such a case, casing material 402 supports substantially acoustically absorbent material 304. Casing material 402 allows at least a portion of acoustic emissions from blade 102 to pass through casing material 402. The acoustic emissions passing through casing material 402 are at least partially absorbed, dampened, or otherwise mitigated by substantially acoustically absorbent material 304 within casing material 402.

In some embodiments, blade 102 is fabricated with casing material 402 and substantially acoustically absorbent material 304 integral to blade 102. Casing material 402 and/or substantially acoustically absorbent material 304 are not added after fabrication of remainder of blade 102. For example and without limitation, blade 102 is fabricated with substantially acoustically absorbent material 304, e.g., foam, forming a core which is encased with a skin of casing material 402, e.g., poly-paraphenylene terephthalamide. Alternatively, substantially acoustically absorbent material 304, e.g., foam, is encased in casing material 402, e.g., fiberglass, which forms the skin of blade 102. Casing material 402, e.g., the fiberglass skin, is then perforated.

In an alternative embodiment, blade 102 is fabricated with casing material and substantially acoustically absorbent material 304 being added to blade 102 to complete trailing edge portion 104. For example and without limitation, serrated portion 106 is made by encapsulating substantially acoustically absorbent material 304, e.g., foam, in an aerodynamically smooth envelop forming casing material 402, e.g., perforated plate. Serrated portion 106 is then coupled, e.g., using an adhesive or fasteners, to blade 102 to complete trailing edge portion 104. Alternatively, substantially acoustically absorbent material 304 and/or casing material 402 is added to blade 102 to complete trailing edge portion 104 using one or more additive manufacturing techniques.

In some embodiments, serrated portion 106 is fabricated by generating a composite of multiple plies of substantially acoustically absorbent material 304. The composite is cut, e.g., water jet cut, to form structures 206 and serrated portion 106. In some embodiments, serrated portion 106 is fabricated by molding a polymer. This allows for serration portions 106 of varying thicknesses 302 to be fabricated to match the thickness of trailing edge portion 104. In some embodiments, serration portion 106 is formed from structural foam. For example and without limitation, serration portion 106 is formed from an open cell foam substantially acoustically absorbent material 304 such as foamed polymethylmethacrylate (PMMA) or foamed polyvinylchloride. Serrations portion 106, including structures 206, are formed by hot pressing the foam into a contour and/or by cutting with a water jet. In some embodiments, serration portion 106 is formed by water cutting a substantially acoustically absorbent material such as polymethacrylimide. The flow resistivity of an open cell foam typically ranges from 10-250 kiloRayleighs per meter (krayl/m). Structural polymer foams tend to be at the low end of the range as they are designed for minimal epoxy uptake. Nonstructural acoustic foams (as in anechoic chambers) are at the high end of the range as they have large pores and are made from different polymeric materials. A dense structural polymer foam would typically be in the lower part of that range. A dense structural polymer foam typically gives an acoustic absorption coefficient within a range of approximately 0.1 and approximately 0.5 for acoustic emissions starting at approximately one kiloHertz (kHz) when included in serration portion 106 having a thickness 302 within a range of approximately two millimeters (mm) and approximately four mm. Other materials and configurations as described herein may result in varying acoustic absorption coefficients.

In some embodiments, substantially acoustically absorbent material 304 and serration portion 106 are formed by partially impregnating layers of material with a resin or to hot press layers of material together with a thermoplastic weave in between layers. This results in substantially acoustically absorbent material 304 with characteristics that allow air to travel through the material. In some alternative embodiments, substantially acoustically absorbent material 304 and/or serration portion 106 is formed as a three dimensional weave. Composites are woven into complete three dimensional shapes which results in a substantially acoustically absorbent material 304.

In some embodiments, clogging of substantially acoustically absorbent material 304 is mitigated by a combination of pore size and placement location on blade 102. Pores of substantially acoustically absorbent material 304 may be susceptible to clogging by airborne particles or debris including, but not limited to, hail, snow, insect debris, dust, soot aggregates, sand, sea spray, ice crystals, pollen, hair, and large bacteria. In some embodiments, substantially acoustically absorbent material 304 is chosen to include substantially small pores which resist clogging. In some embodiments, serrated portion 106 is placed near tip portion 126 of blade 102. This results in an angular velocity of substantially acoustically absorbent material 304 which resists clogging of the pores. In still further embodiments, turbulence at trailing edge portion 104 prevents clogging of the pores.

Figure 5:
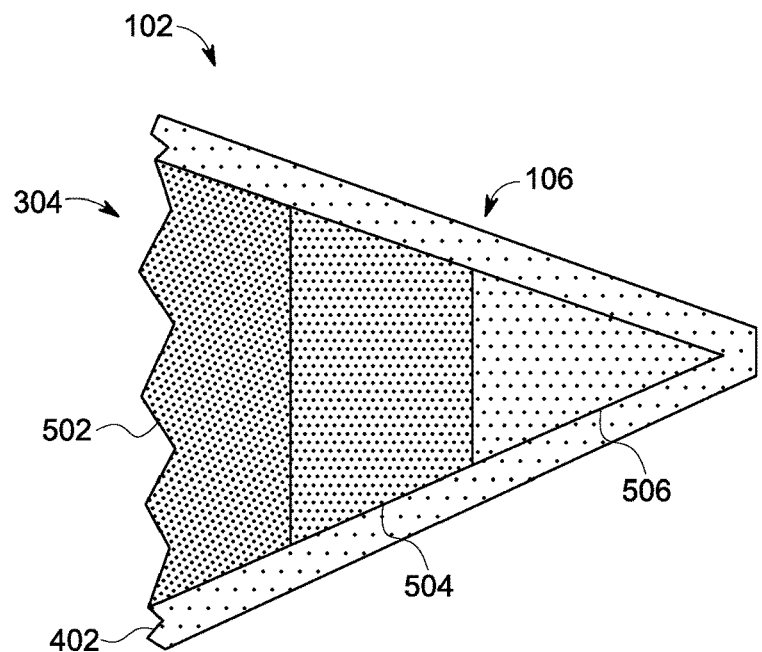
FIG. 5 is a schematic cross-sectional view of an alternative serration of the wind turbine blade shown in FIG. 3.

FIG. 5 is a schematic cross-sectional view of one embodiment of serrated portion 106 including a plurality of substantially acoustically absorbent materials 304. A first substantially acoustically absorbent material 502, a second substantially acoustically absorbent material 504, and a third substantially acoustically absorbent material 506 are encased within casing material 402. First substantially acoustically absorbent material 502, second substantially acoustically absorbent material 504, and third substantially acoustically absorbent material 506 are oriented vertically, relative to a low pressure side of airfoil 300 (not shown in FIG. 5), within casing material 402. In an alternative embodiment, first substantially acoustically absorbent material 502, second substantially acoustically absorbent material 504, and third substantially acoustically absorbent material 506 are oriented horizontally, relative to a low pressure side of airfoil 300 (not shown in FIG. 5), within casing material 402. First substantially acoustically absorbent material 502 at least partially overlaps second substantially acoustically absorbent material 504. Second substantially acoustically absorbent material 504 at least partially overlaps third substantially acoustically absorbent material 506.

Figure 6:
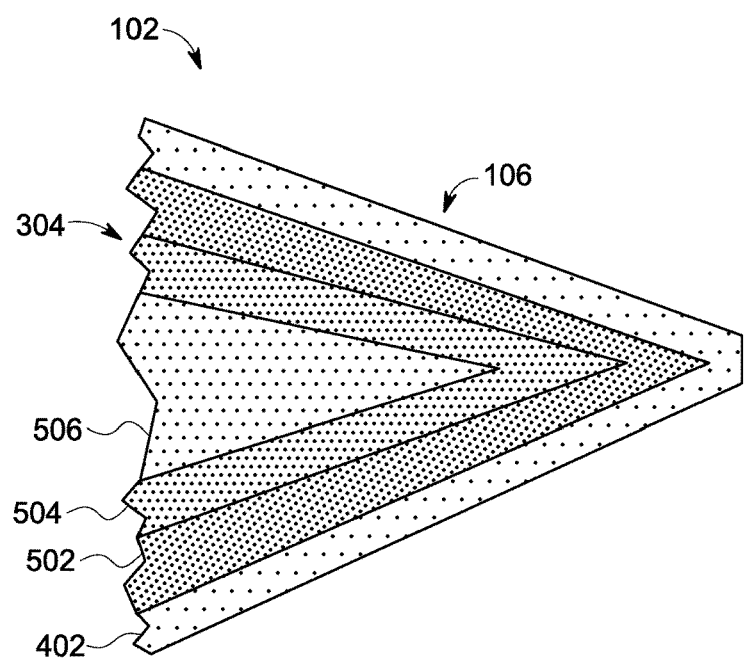
FIG. 6 is a schematic cross-sectional view of another alternative serration of the wind turbine blade shown in FIG. 3.

FIG. 6 is a schematic cross-sectional view of another embodiment of serrated portion 106 including a plurality of substantially acoustically absorbent materials 304. First substantially acoustically absorbent material 502, second substantially acoustically absorbent material 504, and third substantially acoustically absorbent material 506 are layered longitudinally and extend radially along blade 102 within serrated portion 106. First substantially acoustically absorbent material 502, second substantially acoustically absorbent material 504, and third substantially acoustically absorbent material 506 are encased within casing material 402. First substantially acoustically absorbent material 502, second substantially acoustically absorbent material 504, and third substantially acoustically absorbent material 506 substantially follow the contours of casing material 402.

Referring now to FIGS. 5 and 6, in some embodiments, serrated portion 106 includes a plurality of substantially acoustically absorbent materials 304. In some embodiments, the plurality of substantially acoustically absorbent materials 304 includes materials of different types. In alternative embodiments, the plurality of substantially acoustically absorbent materials 304 include sections of a single substantially acoustically absorbent material 304 with each section having a different orientation. In some embodiments, the plurality of substantially acoustically absorbent materials includes three substantially acoustically absorbent materials 304. In alternative embodiments, the plurality of substantially acoustically absorbent materials 304 includes, for example and without limitation, two, four, five, or more substantially acoustically absorbent materials.

Referring now to FIGS. 3-6, in some embodiments, serrated portion 106 forms a portion of a lightning protection system (not shown). Serrated portion 106 is at least partially metallic such that serrated portion 106 is electrically conductive. In some embodiments, substantially acoustically absorbent material 304 is at least partially metallic. For example and without limitation, substantially acoustically absorbent material 304 is micro-perforated metal. In some embodiments, casing material 402 is at least partially metallic. For example and without limitation, casing material 402 is perforated plate made of metal. In some embodiments, casing material 402 is at least partially metallic and substantially acoustically absorbent material 304 is not metallic. In some embodiments, substantially acoustically absorbent material 304 is at least partially metallic and casing material 402 is not metallic. In further embodiments, both substantially acoustically absorbent material 304 and casing material 402 are at least partially metallic. Serrated portion 106 is coupled to a lighting protection system such that the at least partially metallic portion of serrated portion 106 is coupled to the lighting protection system. The combination of at least partially metallic serrated portion 106 and the lighting protection system may shield components of wind turbine generator 100, including but not limited to a generator, electricity transmission equipment, and control equipment, from lighting which strikes wind turbine generator 100.

Referring now to FIGS. 7-10, each discussed individually below, an un-serrated wind turbine blade 702 is retrofitted to include serrated portions 106 and at least one substantially acoustically absorbent material 304 using a retrofit system 902 (e.g., a wind turbine noise abatement device). This is in contrast to fabricating a blade 102 which includes serrated portions 106 and at least one substantially acoustically absorbent material 304. After retrofitting, un-serrated wind turbine blade 702 includes serrated portion 106 and at least one substantially acoustically absorbent material 304 as described herein with respect to blade 102. In some embodiments, retrofit system 902 includes a mounting structure 1002 for coupling retrofit system 902 to trailing edge portion 104 of un-serrated wind turbine blade 702. Retrofit system 902 also includes at least one serrated portion 106 extending at least partially along mounting structure 1002. Serrated portion 106 includes at least one substantially acoustically absorbent material 304. Serrated portion 106 includes structures 206 as described herein. In some embodiments, serrated portion 106 and/or retrofit system 902 includes additional components and/or features described herein including, without limitation, one or more of a plurality of layered substantially acoustically absorbent materials 304 (not shown), casing material 402, a lighting protection system, adhesive, and fasters.

Figure 7:
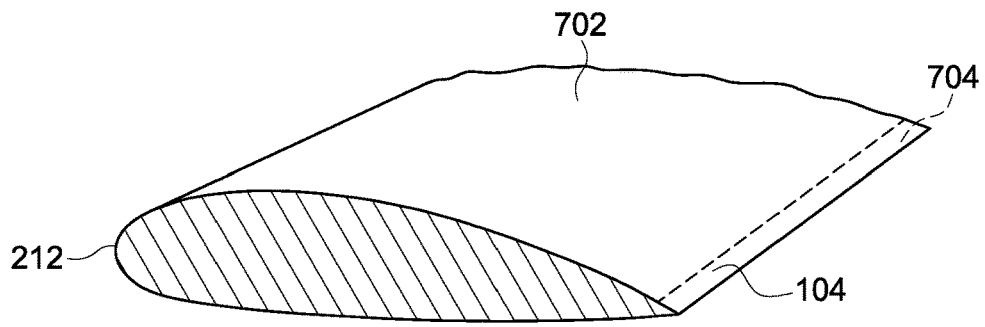
FIG. 7 is a schematic perspective cutaway view of an exemplary un-serrated wind turbine blade.

FIG. 7 is a schematic perspective cutaway view of an exemplary un-serrated wind turbine blade 702. Un-serrated wind turbine blade 702 includes leading edge portion 212 and trailing edge portion 104. During retrofitting, a portion 704 of trailing edge portion 104 is removed from un-serrated wind turbine blade 702. For example, portion 704 of trailing edge portion 104 is cut from trailing edge portion 104. This prepares trailing edge portion 104 to receive retrofit system 902.

Figure 8:
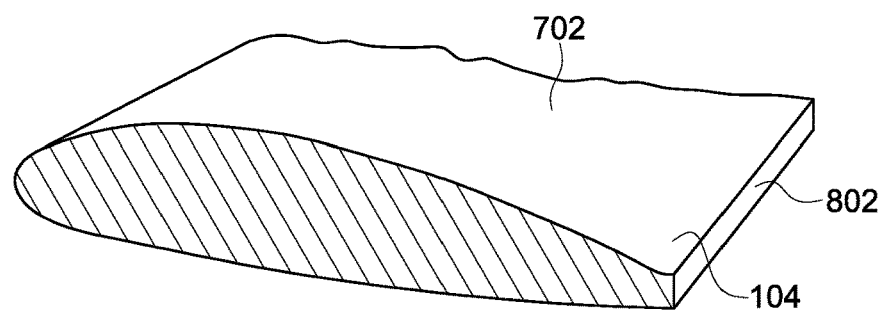
FIG. 8 is a schematic perspective cutaway view of the wind turbine blade shown in FIG. 7 with a portion of the trailing edge removed for retrofitting with serrations.

FIG. 8 is a schematic perspective cutaway view of un-serrated wind turbine blade 702 with portion 704 (shown in FIG. 7) of trailing edge portion 104 removed. The removal of portion 704 of trailing edge portion 104 creates mounting surface 802. In some embodiments, mounting surface 802 is substantially vertical relative to a high pressure side of un-serrated wind turbine blade 702. The portion of trailing edge portion 104 removed is substantially equal in length, extending radially along un-serrated wind turbine blade 702, as serrated portion 106 to be added to un-serrated wind turbine blade 702. Portion 704 of trailing edge portion 104 removed is cut from trailing edge portion 104, or otherwise removed, at the location along the radial length of un-serrated wind turbine blade 702 at which serrated portion 106 is desired to be added. For example, portion 704 of trailing edge portion 104 may be removed from un-serrated wind turbine blade 702 near tip portion 126 (not shown in FIG. 8) such that serrated portion 106 will be added to un-serrated wind turbine blade 702 within a distance of thirty percent of the length of un-serrated wind turbine blade 702 from tip portion 126, e.g., serrated portions 106 will be within the radially outboard thirty percent of un-serrated wind turbine blade 702. As described herein, serrated portion 106 is located elsewhere relative to un-serrated wind turbine blade 702 in alternative embodiments. In some embodiments, mounting surface 802 is prepared to facilitate attachment of retrofit system 902. For example and without limitation, mounting surface 802 is planed, sanded, cleaned, or otherwise prepared.

Figure 9:
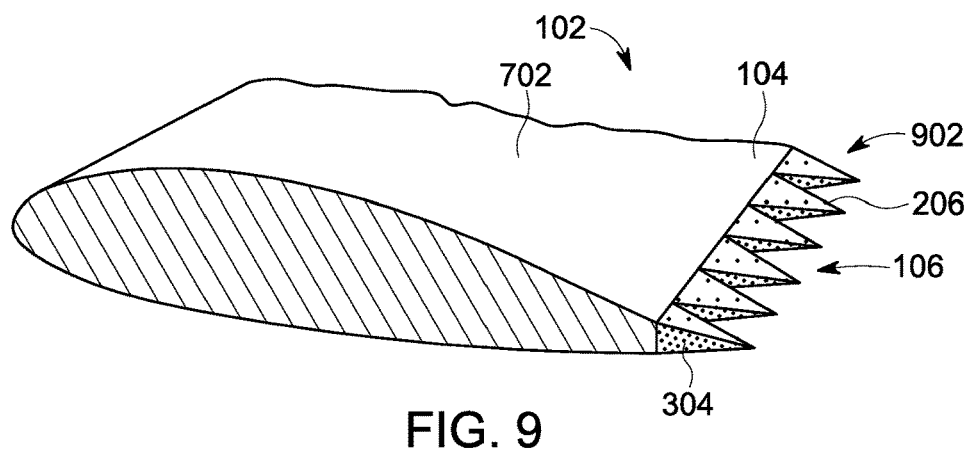
FIG. 9 is a schematic perspective cutaway view of the wind turbine blade shown in FIG. 7 after having been retrofit to include serrations.

FIG. 9 is a schematic perspective cutaway view of un-serrated wind turbine blade 702 shown in FIG. 7 after having been retrofit with retrofit system 902. Retrofit system 902 is attached to mounting surface 802. In some embodiments, mounting structure 1002 (shown in FIG. 10 and discussed further below) is coupled to mounting surface 802. For example, mounting structure 1002 and/or mounting surface 802 may be treated with an adhesive. Mounting structure 1002 and mounting surface 802 are brought together and coupled together via the adhesive. In alternative embodiments, mounting structure 1002 and mounting surface 802 are coupled together using other techniques and/or components including, but not limited to, fasteners, welding, or other joining techniques. The resulting wind turbine blade 102 includes a portion of un-serrated wind turbine blade 702 and retrofit system 902.

After retrofitting with retrofit system 902, the resulting wind turbine blade 102 has an increased acoustic absorption coefficient relative to the unmodified un-serrated wind turbine blade 702 due to the inclusion of substantially acoustically absorbent material 304. Additionally, the resulting wind turbine blade 102 has reduced coherent scattering of acoustic emissions in relative to the unmodified un-serrated wind turbine blade 702 due to the geometry of serrated portion 106 and structures 206.

Figure 10:
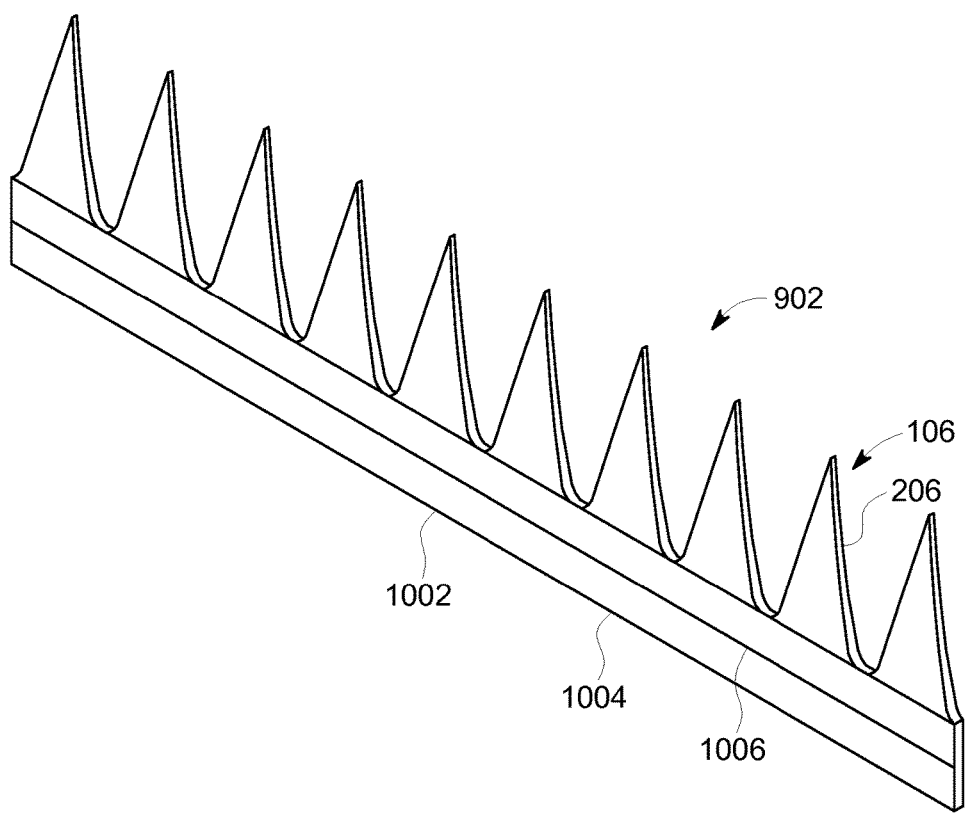
FIG. 10 is a schematic perspective view of an exemplary retrofit system for adding serrations to the trailing edge of the wind turbine blade shown in FIG. 7.

FIG. 10 is a schematic perspective view of an alternative retrofit system 902 for adding serrated portion 106 to trailing edge 104 of un-serrated wind turbine blade 702. This alternative retrofit system 902 is used to retrofit un-serrated wind turbine blade 702 without removing portion 704 of trailing edge portion 104 as shown in FIGS. 7-9. Retrofit system 902 includes mounting structure 1002. Mounting structure is a substantially rectangular plate 1004. Serrated portion 106 extends laterally from rectangular plate 1004 and includes structures 106. Serrated portion 106 and structures 206 include at least one substantially acoustically absorbent material 304 (shown in FIGS. 3-6 and 9). Substantially rectangular plate 1004 includes an attachment surface 1006. Attachment surface 1006 is attached to trailing edge portion 104 of un-serrated wind turbine blade 702. A portion of trailing edge portion 104 is not removed prior to attaching retrofit system 902. Rather, attachment surface 1006 is coupled to a low pressure side of un-serrated wind turbine blade 702 at trailing edge portion 104. Alternatively, attachment surface 1006 is coupled to a high pressure side of un-serrated wind turbine blade 702 at trailing edge portion 104. Attachment surface 1006 may be coupled to un-serrated wind turbine blade 702 using techniques and/or components including, but not limited to, adhesives, fasteners, welding, or other joining techniques. Retrofit system 902 including serration portion 106 is fabricated as described herein with respect to serration portion 106.

Figure 11:
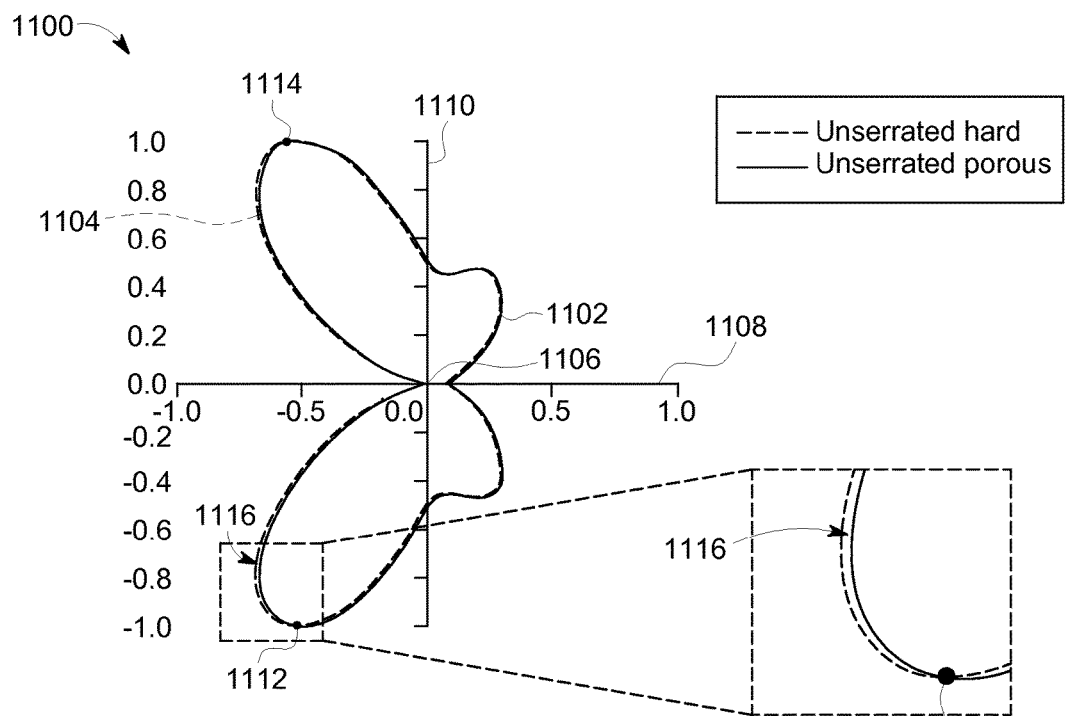
FIG. 11 is an exemplary graphical view of a comparison between the noise generated by a wind turbine blade having a hard, un-serrated trailing edge and a wind turbine blade having an acoustically absorbent, un-serrated trailing edge at a first frequency.

FIG. 11 is an exemplary graphical view, i.e., graph 1100 of a comparison between the normalized noise directivities of a wind turbine blade having a hard, un-serrated trailing edge and a wind turbine blade having an acoustically absorbent, un-serrated trailing edge. The product of the acoustic wave number and the chord of the wind turbine blade is 5. The trailing edge of each wind turbine blade is centered at origin 1106. Graph 1100 includes an x-axis 1108 representative of normalized acoustic emissions extending horizontally from the trailing edge of the wind turbine blade on a linear scale from a value of 0 to a value of 1. Graph 1100 includes a y-axis 1110 representative of normalized acoustic emissions extending vertically from the trailing edge of the wind turbine blade on a linear scale from a value of 0 to a value of 1. First plot 1102 corresponds to noise generated by a wind turbine blade having an acoustically absorbent, un-serrated trailing edge. Second plot 1104 corresponds to noise generated by a wind turbine blade having a hard, un-serrated trailing edge. The direction in which the noise from either wind turbine blade is at the highest value is indicated with a value of 1.0. In this case, noise generated by a wind turbine blade having a hard, un-serrated trailing edge is greatest at point 1112 and point 1114 of plot 1104. Point 1114 corresponds to noise emitted above and forward from the trailing edge located at origin 1106. Point 1112 corresponds to noise emitted below and forward from the trailing edge located at origin 1106.

The inclusion of at least one substantially acoustically absorbent material 304 in a wind turbine blade results in a reduction of the noise generated as shown by comparing first plot 1102 to second plot 1104. The reduction in noise generated due to substantially acoustically absorbent material 304 is shown as gap 1116 between first plot 1102 and second plot 1104, first plot 1102 generally having lesser normalized values of noise emission. The reduction in noise varies based on directivity. For example, the inclusion of substantially acoustically absorbent material 304 results in a greater reduction in noise forward of the trailing edge located at origin 1106 than rearward of the trailing edge.

Figure 12:
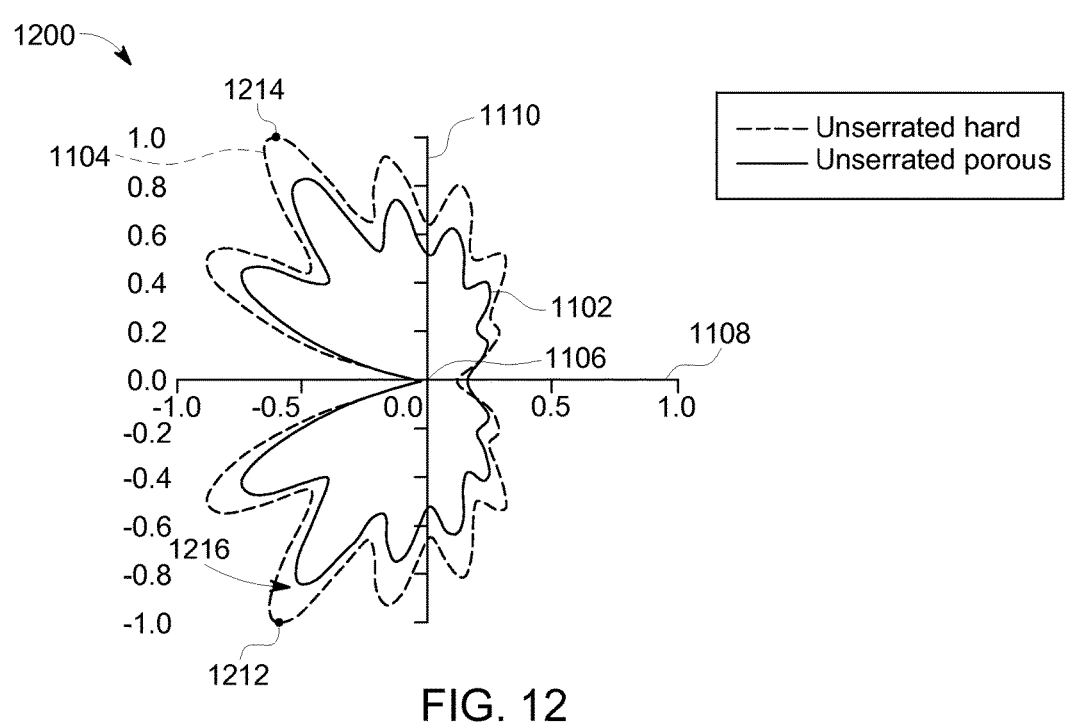
FIG. 12 is an exemplary graphical view of a comparison between the noise generated by a wind turbine blade having a hard, un-serrated trailing edge and a wind turbine blade having an acoustically absorbent, un-serrated trailing edge at a second, higher frequency.

FIG. 12 is an exemplary graphical view, i.e., graph 1200 of a comparison between the normalized noise directivities of a wind turbine blade having a hard, un-serrated trailing edge and a wind turbine blade having an acoustically absorbent, un-serrated trailing edge. The product of the acoustic wave number and the chord of the wind turbine blade is 18. The trailing edge of each wind turbine blade is centered at origin 1106. Graph 1200 includes an x-axis 1108 representative of normalized acoustic emissions extending horizontally from the trailing edge of the wind turbine blade on a linear scale from a value of 0 to a value of 1. Graph 1200 includes a y-axis 1110 representative of normalized acoustic emissions extending vertically from the trailing edge of the wind turbine blade on a linear scale from a value of 0 to a value of 1. First plot 1102 corresponds to noise generated by a wind turbine blade having an acoustically absorbent, un-serrated trailing edge. Second plot 1104 corresponds to noise generated by a wind turbine blade having a hard, un-serrated trailing edge. The direction in which the noise from either wind turbine blade is at the highest value is indicated with a value of 1.0. In this case, i.e., where the product of the acoustic wave number and the chord of the wind turbine blade is 18, noise generated by a wind turbine blade having a hard, un-serrated trailing edge is greatest at point 1212 and point 1214 of plot 1104. Point 1214 corresponds to noise emitted above and forward from the trailing edge located at origin 1106. Point 1212 corresponds to noise emitted below and forward from the trailing edge located at origin 1106.

At higher frequencies, in this case where the product of the acoustic wave number and the chord of the wind turbine blade is 18, the inclusion of at least one substantially acoustically absorbent material 304 results in a reduction of the noise generated as shown by comparing first plot 1102 to second plot 1104. The reduction in noise generated due to substantially acoustically absorbent material 304 is shown as gap 1216 between first plot 1102 and second plot 1104, first plot 1102 generally having lesser normalized values of noise emission. The reduction in noise varies based on directivity. For example, the inclusion of substantially acoustically absorbent material 304 results in a greater reduction in noise forward of the trailing edge located at origin 1106 than rearward of the trailing edge. Comparing graph 1100 (shown in FIG. 11) of noise emissions for a wind turbine blade having a product of acoustic wave number and chord length of 5 to graph 1200 (shown in FIG. 12), the inclusion of at least one substantially acoustically absorbent material 304 results in a greater mitigation of noise produced by the wind turbine blade at higher frequencies. Gap 1216 is generally larger than gap 1116.

FIG. 13 is an exemplary graphical view, i.e., graph 1300 of a comparison between the normalized noise of a wind turbine blade having a hard, serrated trailing edge and wind turbine blade 102 (shown in FIGS. 1-4, 6 and 9) having an acoustically absorbent, serrated trailing edge. The product of the acoustic wave number and the chord of the wind turbine blade is 5. The trailing edge of each wind turbine blade is centered at origin 1106. Graph 1300 includes an x-axis 1108 representative of normalized acoustic emissions extending horizontally from the trailing edge of the wind turbine blade on a linear scale from a value of 0 to a value of 1. Graph 1300 includes a y-axis 1110 representative of normalized acoustic emissions extending vertically from the trailing edge of the wind turbine blade on a linear scale from a value of 0 to a value of 1. Third plot 1302 corresponds to noise generated by wind turbine blade 102 having an acoustically absorbent, serrated trailing edge. Fourth plot 1304 corresponds to noise generated by a wind turbine blade having a hard, serrated trailing edge. The direction in which the noise from either wind turbine blade is at the highest value is indicated with a value of 1.0. In this case, noise generated by a wind turbine blade having a hard, serrated trailing edge is greatest at point 1312 and point 1114 of plot 1304. Point 1314 corresponds to noise emitted above and forward from the trailing edge located at origin 1106. Point 1312 corresponds to noise emitted below and forward from the trailing edge located at origin 1106.

The inclusion of at least one substantially acoustically absorbent material 304 and serrated portion 106 results in a reduction in noise generated in comparison to the inclusion of serrated portion 106 alone as shown by comparing third plot 1302 to fourth plot 1304. The reduction in noise generated due to substantially acoustically absorbent material 304 and serrated portion 106 is shown as gap 1316 between third plot 1302 and fourth plot 1304, third plot 1302 generally having lesser normalized values of noise emission. The reduction in noise varies based on directivity. For example, the inclusion of substantially acoustically absorbent material 304 and serrated portion 106 results in a greater reduction in noise forward of the trailing edge located at origin 1106 than rearward of the trailing edge. Additionally, the inclusion of at least one substantially acoustically absorbent material 304 and serrated portion 106 results in a reduction in noise generated in comparison to the inclusion of acoustically absorbent material 304 alone as shown by comparing third plot 1302 (shown in FIG. 13) to first plot 1102 (shown in FIG. 11). In the case of wind turbine blades having a product of the acoustic wave number and the chord length equal to 5, wind turbine blade 102 with serrated portion 106 and acoustically absorbent material 304, represented by third plot 1302 (shown in FIG. 13) generates less noise than a wind turbine blade with an acoustically absorbent material alone, represented by first plot 1102 (shown in FIG. 11).

FIG. 14 is an exemplary graphical view, i.e., graph 1400 of a comparison between the normalized noise of a wind turbine blade having a hard, serrated trailing edge and wind turbine blade 102 having an acoustically absorbent, serrated trailing edge. The product of the acoustic wave number and the chord of the wind turbine blade is 18. The trailing edge of each wind turbine blade is centered at origin 1106. Graph 1400 includes an x-axis 1108 representative of normalized acoustic emissions extending horizontally from the trailing edge of the wind turbine blade on a linear scale from a value of 0 to a value of 1. Graph 1400 includes a y-axis 1110 representative of normalized acoustic emissions extending vertically from the trailing edge of the wind turbine blade on a linear scale from a value of 0 to a value of 1. Third plot 1302 corresponds to noise generated by wind turbine blade 102 having an acoustically absorbent, serrated trailing edge. Fourth plot 1304 corresponds to noise generated by a wind turbine blade having a hard, serrated trailing edge. The direction in which the noise from either wind turbine blade is at the highest value is indicated with a value of 1.0. In this case, noise generated by a wind turbine blade having a hard, serrated trailing edge is greatest at point 1412 and point 1414 of plot 1304. Point 1414 corresponds to noise emitted above and rearward from the trailing edge located at origin 1106. Point 1412 corresponds to noise emitted below and rearward from the trailing edge located at origin 1106.

At higher frequencies, in this case where the product of the acoustic wave number and the chord of the wind turbine blade is 18, the inclusion of serrated portion 106 and acoustically absorbent material 304 results in a reduction of the noise generated as shown by comparing third plot 1302 to fourth plot 1304. The reduction in noise generated due to substantially acoustically absorbent material 304 and serrated portion 106 is shown as gap 1416 between third plot 1302 and fourth plot 1304, third plot 1302 generally having lesser normalized values of noise emission. The reduction in noise varies based on directivity. For example, the inclusion of substantially acoustically absorbent material 304 and serrated portion 106 results in a greater reduction in noise rearward of the trailing edge located at origin 1106 than forward of the trailing edge. This is because the directivity of the noise levels with the higher amplitudes is rearward of the trailing edge at origin 1106. Comparing graph 1300 (shown in FIG. 13) of noise emissions for wind turbine blades having a product of acoustic wave number and chord length equal to 5 to graph 1400 (shown in FIG. 14), the inclusion of at least one substantially acoustically absorbent material 304 and serrated portion 106 results in a greater mitigation of noise produced by the wind turbine blade at higher frequencies. Gap 1416 is generally larger than gap 1316.

The inclusion of both serrated portion 106 and at least one acoustically absorbent material 304 in trailing edge portion 104 of wind turbine blade 102 results in a greater reduction in noise than the inclusion of serrated portion 106 alone or at least one acoustically absorbent material 304 alone. This effect is seen at least by comparing FIG. 14 to FIG. 13. Comparing the noise emissions of a un-serrated, hard wind turbine blade, represented by second plot 1104 (shown in FIG. 12) to noise emissions of a serrated, hard wind turbine blade, represented by fourth plot 1304 (shown in FIG. 14), serrated portions 106 mitigate noise emissions alone. Similarly, Comparing the noise emissions of a un-serrated, hard wind turbine blade, represented by second plot 1104 (shown in FIG. 12) to noise emissions of a un-serrated, acoustically absorbent wind turbine blade, represented by first plot 1102 (shown in FIG. 12), acoustically absorbent material 304 mitigates noise emissions alone. However, the combination of serrated portions 106 and acoustically absorbent material 304 has a greater cumulative mitigation of noise emissions than either alone. This effect is shown in comparing wind turbine blade 102 having serrated portions 106 and acoustically absorbent material 304, represented by third plot 1302 (shown in FIG. 14) to an un-serrated, hard wind turbine blade, represented by second plot 1104 (shown in FIG. 12). The reduction in noise emitted by wind turbine blade 102 having serrated portion 106 and acoustically absorbent material 304 is greater than the mitigation in noise achieved by a wind turbine blade with serrated portion 106 alone or a wind turbine blade with acoustically absorbent material 304 alone.

Referring now to FIGS. 11-14, there is a directivity dependent reduction in noise due to the inclusion of at least one acoustically absorbent material 304 in trailing edge portion 104. The inclusion of at least one acoustically absorbent material 304 in trailing edge portion results in a more significant reduction of noise when paired with serrated portion 106 in comparison to a straight trailing edge portion 104. The reduction in noise achieved by inclusion of serrated portion 106 and/or substantially acoustically absorbent material 304 is greater at higher frequencies. The greatest reduction in noise occurs at the loudest part of the directivity.

The above described wind turbine blade and retrofit system provide for reduction in noise generated by wind turbine blades. Specifically, the turbine blade and retrofit system include serrations fabricated from an acoustically absorbent material to mitigate noise produced by the wind turbine blade. Boundary-layer turbulence interaction with the trailing edge of the wind turbine blade, while in motion, is a primary source of aerodynamic noise emanating from wind turbine blades in operation. The serrated portions included in a trailing edge portion of the wind turbine blade reduce coherent scattering of the noise emanating from the wind turbine blade. Reducing coherent scattering of the quadrupole sources mitigates the noise emanating from the wind turbine blade while in operation. The substantially acoustically absorbent materials function as sound absorbers and/or turbulence dampers. The acoustically absorbent materials reduce a magnitude of the sound reflected from the wind turbine blade in comparison to wind turbine blades having hard surfaces and/or materials. The acoustically absorbent materials thus mitigate noise emanating from the wind turbine blade while in operation.

Moreover, the reduction in noise emanating from the wind turbine blades reduces the need for the wind turbine to be put into NRO mode to comply with a dB level that may approach local regulatory levels. The reduction in NRO increases the AEP of the wind turbine. Therefore, the serrated portions and at least one acoustically absorbent material included in the trailing edge portion of the wind turbine blade enhance power generation of wind turbine generators.

An exemplary technical effect of the methods, systems, and apparatus described herein includes at least one of: (a) reduced coherent scattering of noise emanating from a wind turbine blade through the use of serrated portions included in the trailing edge portion of the blade; (b) absorption of noise emanating from a wind turbine blade through the use of at least one acoustically absorbent material included in the trailing edge portion of the blade; (c) mitigation of noise emanating from a wind turbine blade through the combination of both serrated portions and at least one substantially acoustically absorbent material; (d) increased AEP by reducing acoustic emissions and reducing the need for NRO; and (e) reduced noise emanating from existing turbine blades through modification of the existing turbine blades with a retrofit system to include serrated portions and at least one substantially acoustically absorbent material.

Exemplary embodiments of methods, systems, and apparatus for reducing acoustic emissions of wind turbine blades are not limited to the specific embodiments described herein, but rather, components of systems and/or steps of the methods may be utilized independently and separately from other components and/or steps described herein. For example, the systems and methods may also be used in addition to other systems and methods for reducing noise emissions of wind turbine blades such as blade pitch control systems, blade speed control systems, and the like, and are not limited to practice with only the systems and methods as described herein. Rather, the exemplary embodiment can be implemented and utilized in addition to many other applications, equipment, and systems that reduce wind turbine blade acoustic emissions.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A wind turbine blade comprising:
   a trailing edge comprising:
      a radially inboard portion;
      a radially outboard portion opposite said radially inboard portion; and
      at least one serrated portion extending at least partially between said radially inboard portion and said radially outboard portion, said serrated portion comprising a base portion and a plurality of tip portions defining a serrated edge, said serrated portion extending from said base portion to said plurality of tip portions in a direction away from a leading edge opposite said trailing edge, said serrated portion comprising at least one substantially acoustically absorbent material encased in a casing material.

2. The wind turbine blade of claim 1, wherein said at least one substantially acoustically absorbent material facilitates increasing an acoustic absorption coefficient of said wind turbine blade.

3. The wind turbine blade of claim 2, wherein said at least one substantially acoustically absorbent material is at least one of structural foam, a series of three dimensional structures including a plurality of pores defined therein formed by additive manufacturing, a self-supporting shell with an epoxy matrix, and a micro-perforated metal.

4. The wind turbine blade of claim 1, wherein said at least one serrated portion comprises a series of substantially triangular structures extending at least partially between said radially inboard portion and said radially outboard portion, each of said substantially triangular structures comprising a base portion and a tip portion, each of said substantially triangular structures extending from said base portion to said tip portion in a direction away from a leading edge opposite said trailing edge, each of said substantially triangular structures having a varying thickness.

5. The wind turbine blade of claim 1 further comprising a lightning protection system comprising said at least one serrated portion, wherein said, at least one substantially acoustically absorbent material is at least partially metallic.

6. The wind turbine blade of claim 1, wherein said at least one substantially acoustically absorbent material comprises a first acoustically absorbent material and a second acoustically absorbent material, said first acoustically absorbent material formed as a first layer and said second acoustically absorbent material formed as a second layer, said first layer and said second layer at least partially overlapping, said first layer and said second layer extending at least one of vertically, horizontally, and longitudinally, said first acoustically absorbent material and said second acoustically absorbent material encased in said casing material.

7. The wind turbine blade of claim 1, further comprising a lightning protection system comprising said at least one serrated portion, wherein at least one of said at least one substantially acoustically absorbent material and said casing material is at least partially metallic.

8. The wind turbine blade of claim 1, wherein said at least one substantially acoustically absorbent material facilitates increasing an acoustic absorption coefficient of said wind turbine blade and wherein said at least one substantially acoustically absorbent material is at least one of structural foam, a series of three dimensional structures including a plurality of pores defined therein formed by additive manufacturing, a self-supporting shell with an epoxy matrix, and a micro-perforated metal.

9. The wind turbine blade of claim 1, wherein said casing material includes poly-paraphenylene terephthalamide.

10. The wind turbine blade of claim 1, wherein said casing material is a perforated plate.

11. The wind turbine blade of claim 1, wherein said at least one substantially acoustically absorbent material and said casing are formed integral with the wind turbine blade.

12. A wind turbine blade comprising:
   a trailing edge comprising:
      a radially inboard portion;
      a radially outboard portion opposite said radially inboard portion; and
      at least one serrated portion extending at least partially between said radially inboard portion and said radially outboard portion, said serrated portion comprising a base portion and a plurality of tip portions defining a serrated edge, said serrated portion extending from said base portion to said plurality of tip portions in a direction away from a leading edge opposite said trailing edge, said serrated portion comprising at least one substantially acoustically absorbent material encased in a casing material,
      wherein said at least one substantially acoustically absorbent material is at least one of structural foam, a series of three dimensional structures including a plurality of pores defined therein formed by additive manufacturing, a self-supporting shell with an epoxy matrix, and a micro-perforated metal.

13. The wind turbine blade of claim 12, wherein said at least one substantially acoustically absorbent material is comprised of a material having an acoustic transmission coefficient that allows acoustic emissions from the blade to pass through said at least one substantially acoustically absorbent material.

14. The wind turbine blade of claim 12, further comprising a lightning protection system comprising said at least one serrated portion, wherein said, at least one substantially acoustically absorbent material is at least partially metallic.

15. The wind turbine blade of claim 12, further comprising a lightning protection system comprising said at least one serrated portion, wherein at least one of said at least one substantially acoustically absorbent material and said casing material is at least partially metallic.

16. The wind turbine blade of claim 12, wherein said casing material includes poly-paraphenylene terephthalamide.

17. The wind turbine blade of claim 12, wherein said casing material is a perforated plate.

18. The wind turbine blade of claim 12, wherein said at least one substantially acoustically absorbent material and said casing are formed integral with the wind turbine blade.

* * * * *